(12) United States Patent
Yu et al.

(10) Patent No.: US 10,817,717 B2
(45) Date of Patent: Oct. 27, 2020

(54) METHOD AND DEVICE FOR PARSING TABLE IN DOCUMENT IMAGE

(71) Applicant: ABC FINTECH CO., LTD., Beijing (CN)

(72) Inventors: Zhou Yu, Beijing (CN); Yongzhi Yang, Beijing (CN); Xian Wang, Beijing (CN)

(73) Assignee: ABC FINTECH CO., LTD., Beijing (CN)

( * ) Notice: Subject to any disclaimer, the term of this patent is extended or adjusted under 35 U.S.C. 154(b) by 302 days.

(21) Appl. No.: 15/955,618

(22) Filed: Apr. 17, 2018

(65) Prior Publication Data
US 2019/0266394 A1    Aug. 29, 2019

(30) Foreign Application Priority Data
Feb. 26, 2018   (CN) .......................... 2018 1 0162749

(51) Int. Cl.
*G06K 9/00*    (2006.01)
*G06K 9/34*    (2006.01)

(52) U.S. Cl.
CPC ..... *G06K 9/00449* (2013.01); *G06K 9/00456* (2013.01); *G06K 9/00463* (2013.01); *G06K 9/344* (2013.01)

(58) Field of Classification Search
None
See application file for complete search history.

(56) References Cited

U.S. PATENT DOCUMENTS

2017/0220858 A1* 8/2017 Stitz .................. G06F 40/18
2018/0322339 A1* 11/2018 Cohen ............... G06K 9/00456

* cited by examiner

*Primary Examiner* — Kevin Ky
(74) *Attorney, Agent, or Firm* — Morgan, Lewis & Bockius LLP (57) ABSTRACT

The present application relates to a method and a device for parsing a table in a document image. The method comprises the following steps: inputting a document image to be parsed which includes one or more table areas into the electronic device; detecting, by the electronic device, a table area in the document image by using a pre-trained table detection model; detecting, by the electronic device, internal text blocks included in the table area by using a pre-trained text detection model; determining, by the electronic device, a space structure of the table; and performing text recognition on a text block in each cell according to the space structure of the table, so as to obtain editable structured data by parsing. The method and the device of the present application can be applied to various tables such as line-including tables or line-excluding tables or black-and-white tables.

17 Claims, 11 Drawing Sheets

A. detecting a table area in a document image to be parsed by using a pre-trained table detection model B. detecting internal text blocks included in the table area by using a pre-trained text detection model C. determining a space structure of the table D. performing text recognition on a text block in each cell according to the determined space structure of the table, so as to obtain editable structured data by parsing

| | 截至6月30日止六个月 | |
|---|---|---|
| | 2017年 | 2016年 |
| 手续费及佣金收入： | | |
| 银行卡 | 18,792 | 18,859 |
| 个人理财及私人银行 (1) | 17,421 | 20,877 |
| 投资银行 | 14,729 | 16,109 |
| 结算、清算及现金管理 | 14,076 | 13,787 |
| 对公理财 (1) | 10,103 | 11,276 |
| 担保及承诺 | 4,290 | 3,195 |
| 资产托管 (1) | 3,487 | 3,965 |
| 代理收付及委托 (1) | 1,088 | 1,105 |
| 其他 | 1,416 | 1,643 |
| 合计 | 85,402 | 90,816 |
| 手续费及佣金支出 | (8,732) | (9,101) |
| 手续费及佣金净收入 | 76,670 | 81,715 |

| | 截至6月30日止六个月 | |
|---|---|---|
| | 2017年 | 2016年 |
| 手续费及佣金收入： | | |
| 银行卡 | 18,792 | 18,852 |
| 个人理财及私人银行(1) | 17,421 | 20,837 |
| 投资银行 | 14,729 | 16,109 |
| 结算、清算及现金管理 | 14,076 | 13,787 |
| 对公理财(1) | 10,103 | 11,278 |
| 担保及承诺 | 4,290 | 3,195 |
| 资产托管(1) | 3,487 | 3,965 |
| 代理收付及委托(1) | 1,088 | 1,165 |
| 其他 | 1,416 | 1,645 |
| 合计 | 85,402 | 90,833 |
| 手续费及佣金支出 | (8,732) | (9,108) |
| 手续费及佣金净收入 | 76,670 | 81,725 |

| | A | B | C |
|---|---|---|---|
| 1 | | 截至6月30日止六个月 | |
| 2 | | 2017年 | 2016年 |
| 3 | 手续费及佣金收入 | | |
| 4 | 银行卡 | 18,792 | 18,859 |
| 5 | 个人理财及私人银行(1) | 17,421 | 20,877 |
| 6 | 投资银行 | 14,729 | 16,109 |
| 7 | 结算、清算及现金管理 | 14,076 | 13,787 |
| 8 | 对公理财(1) | 10,103 | 11,276 |
| 9 | 担保及承诺 | 4,290 | 3,195 |
| 10 | 资产托管(1) | 3,487 | 3,965 |
| 11 | 代理收付及委托(1) | 1,088 | 1,105 |
| 12 | 其他 | 1,416 | 1,643 |
| 13 | 合计 | 85,402 | 90,816 |
| 14 | 手续费及佣金支出 | (8,732) | (9,101) |
| 15 | 手续费及佣金净收入 | 76,670 | 81,715 |

METHOD AND DEVICE FOR PARSING TABLE IN DOCUMENT IMAGE

CROSS-REFERENCE TO RELATED APPLICATION

This application claims the benefit of Chinese Patent Application No. 201810162749.4, filed Feb. 26, 2018 with State Intellectual Property Office, the People's Republic of China, the entire content of which is incorporated by reference herein.

TECHNICAL FIELD

The present application relates to the technical field of data processing, and particularly, relates to a method and a device for parsing a table in a document image.

BACKGROUND

In recent years, as the digitization degree of information continues to increase, the volume of data in the form of document images tends to be massive. The structured data formed by extracting information from the document images can be used for better constructing indexes to help search, and can also be used for scientific research, engineering, statistics, strategy making, market research, etc., in order to provide quantitative data.

The table as the simplest expression of a data record summary is the basis for data analysis. The data collection efficiency undoubtedly can be improved by automatically recognizing the table data of the document images and restoring the table content in the images into structured data.

Generally, two kinds of tables are included in documents, wherein one kind of tables includes a table area with lines and is referred to as a line-including table, and the other kind of tables does not have a line-including frame and is referred as a line-excluding table. For the recognition, extraction and processing of a line-including table at present, the table structure is obtained by detecting horizontal and vertical lines in the document image, determining a table area through connected areas formed by the lines and performing structural segmentation of cells according to the intersection points of the horizontal and vertical lines. For the recognition and extraction of a line-excluding table, the line-excluding table is obtained by detecting the color and texture background and separating the texts within such areas. However, the two methods both have defects, for example, the method of extracting the table area with horizontal and vertical lines and performing structural segmentation to obtain the table structure for parsing obviously can only be applied to extracting a table area formed by regular lines, but cannot process such table areas not including straight lines or including part of straight lines; and the method of detecting and extracting a line-excluding table by detecting the color and texture background obviously can only be applied to such tables with color and texture backgrounds, whereas most tables have white backgrounds and black characters and do not have the color or texture background.

SUMMARY

The objective of the present application is to overcome the defects of poor adaptability and incapability of effectively parsing various tables, and to provide a method and a device for parsing a table in a document image.

In order to fulfill the above objective, the embodiments of the present application provide the following technical solutions:

In one aspect, an embodiment of the present application provides a method for parsing a table in a document image on an electronic device, including the following steps: inputting a document image to be parsed which includes one or more table areas into the electronic device;

detecting, by the electronic device, a table area in the document image by using a pre-trained table detection model;

detecting, by the electronic device, internal text blocks included in the table area by using a pre-trained text detection model;

determining, by the electronic device, a space structure of the table; and performing, on the electronic device, text recognition on the text block in each cell according to the determined space structure of the table, so as to obtain editable structured data by parsing.

In another aspect, an embodiment of the present application provides a device for parsing a table in a document image on an electronic device, including: a table area detection module, a text block detection module, a table space structure determination module and a text recognition module, wherein a document image to be parsed which includes one or more table areas is inputted into the electronic device; and the table area detection module is configured to detect a table area in a document image to be parsed by using a pre-trained table detection model;

the text block detection module is configured to detect internal text blocks included in the table area by using a pre-trained text detection model;

the table space structure determination module is configured to determine a space structure of the table; and the text recognition module is configured to perform text recognition on the text block in each cell according to the determined space structure of the table, so as to obtain editable structured data by parsing.

In another aspect, an embodiment of the present application provides a computer readable storage medium including computer readable instructions, wherein a processor executes the operations in the method of the embodiment of the present application when the computer readable instructions are executed.

In another aspect, an embodiment of the present application provides an electronic equipment, including: a memory, configured to store program instructions; and a processor, connected with the memory, and configured to execute the program instructions in the memory to implement the steps of the method in the embodiment of the present application. Compared with the prior art, the present application has the advantages that a table detection model and a text detection model are pre-trained based on deep learning, and a table area and text blocks can be accurately detected by directly using the two detection models, so that the method and the device of the present application can be applied to various tables such as a line-including table or a line-excluding table or a black-and-white table, the table parsing efficiency and accuracy are improved, and a simple and effective solution is provided for parsing tables in document images.

BRIEF DESCRIPTION OF THE DRAWINGS

In order to illustrate the technical solutions in the embodiments of the present application more clearly, a brief introduction will be made below to the drawings required in the embodiments. It should be understood that the drawings below only show some embodiments of the present application and should not be regarded as limit to the scope, and other relevant drawings could be obtained based on these drawings by those of ordinary skill in the art without any creative efforts.

DETAILED DESCRIPTION OF THE EMBODIMENTS

A clear and complete description will be made to the technical solutions in the embodiments of the present application below in combination with the drawings in the embodiments of the present application. Apparently, the embodiments described are only part of the embodiments of the present application, not all of them. Generally, the components of the embodiments of the present application described and shown in the drawings here may be arranged and designed with various different configurations. Therefore, the detailed description of the embodiments of the present application provided in the drawings below is not intended to limit the protection scope of the present application, but only indicates the selected embodiments of the present application. All other embodiments obtained by those skilled in the art without creative efforts based on the embodiments of the present application shall fall within the protection scope of the present application.

Figure 1:
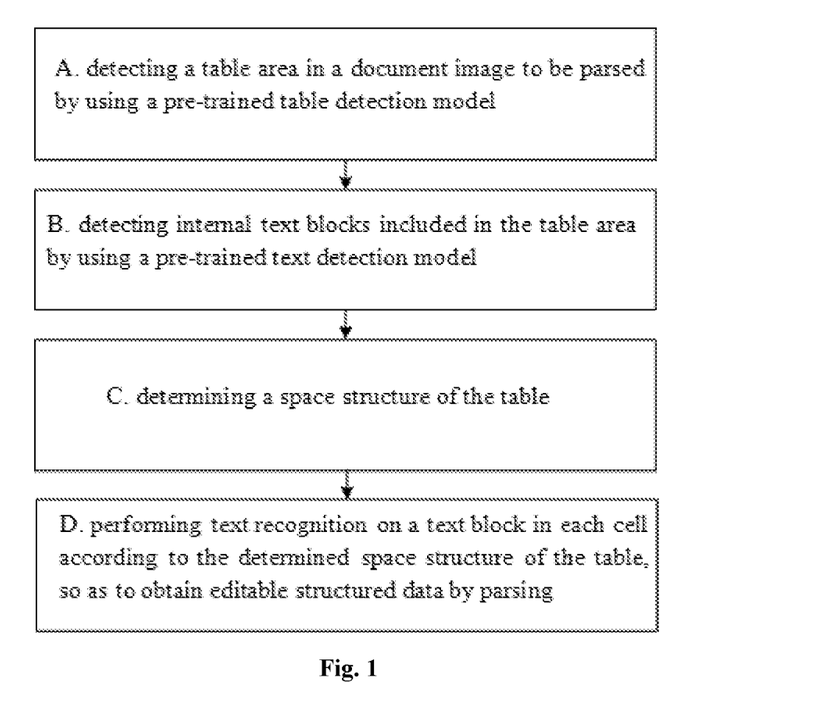
FIG. 1 is a flow diagram of a method for parsing a table in a document image according to some embodiments of the present application.
Figure 4:
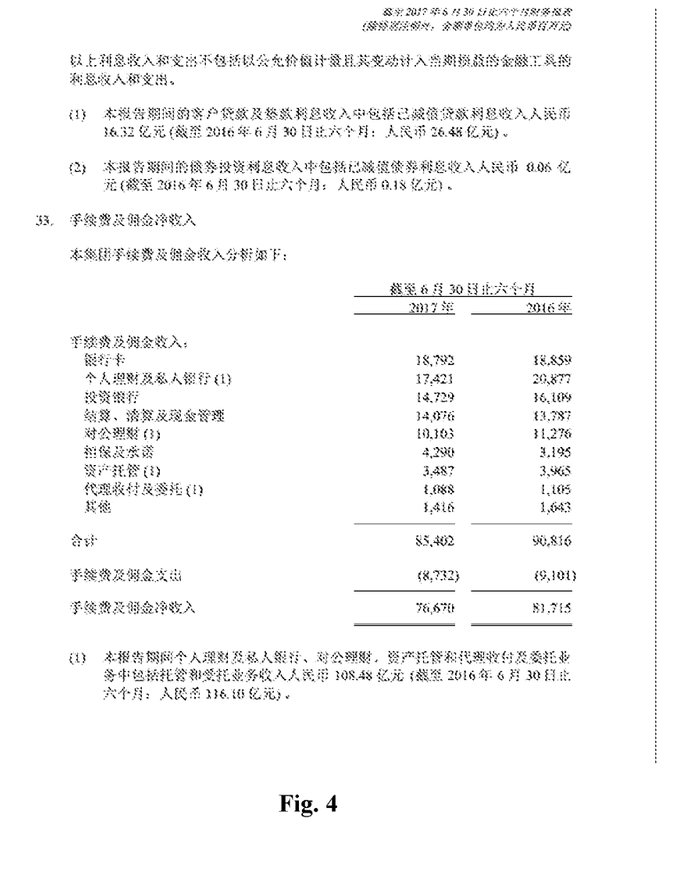
FIG. 4 is an original document image containing a table according to some embodiments of the present application.
Figure 5:
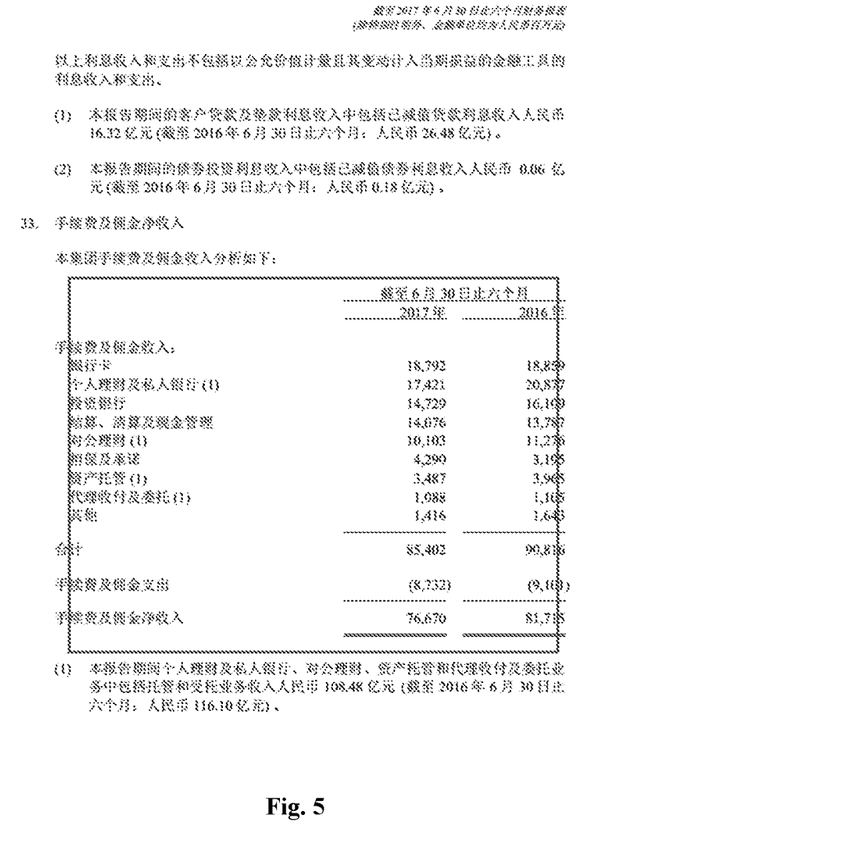
FIG. 5 is a state diagram of FIG. 4 output by a table detection model according to some embodiments of the present application.

Referring to FIG. 1, a method for parsing a table in a document image according to this embodiment includes the following steps:

A. detect a table area in a document image to be parsed by using a pre-trained table detection model. As shown in FIGS. 4 and 5, FIG. 4 is an original document image including a table, and FIG. 5 is a document image after a table area is detected.

Figure 2:
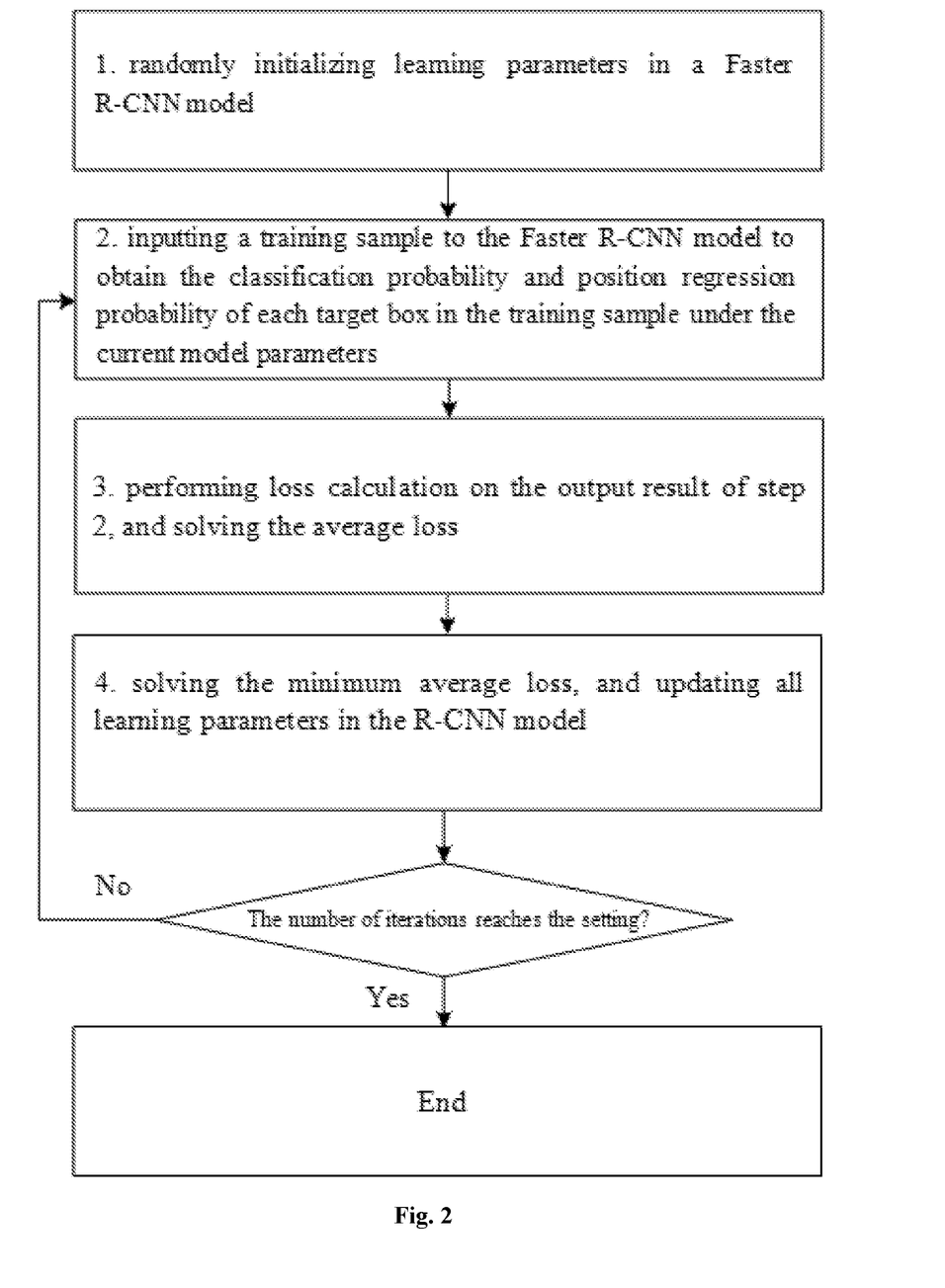
FIG. 2 is a training flow diagram of a Faster R-CNN model according to some embodiments of the present application.

In this step, the table detection model is obtained by training a Faster R-CNN model based on a deep learning method. The Faster R-CNN model is mainly used for detecting targets in natural scenes, such as vehicles, people, animals, etc. However, the inventor found in studies, when the model is applied to the detection of the table area, a good detection effect can be achieved, and both the judgment on the table area and the position regression are relatively accurate. A sample for training the Faster R-CNN model includes a training set and a test set, the test set comes from manual marks, and target boxes of line-including tables and line-excluding tables are marked in document images (e.g., PDF pages). Adopted is an object-detection module in models provided by tensor flow, and specifically used is a Faster R-CNN target detection frame model for training. The number of target categories is 3, that is, a background, a line-including table and a line-excluding table. The scale generated by an anchor is extended to [0.25, 0.5, 1.0, 2.0, 4.0], and the width-height sliding step is reduced to 8 so as to obtain denser anchors. Referring to FIG. 2, in this embodiment, specifically, the process of training the Faster R-CNN model is as follows:

step 1, randomly initializing learning parameters in the Faster R-CNN model, e.g., initializing the learning rate to be 0.0003 and the momentum to be 0.9 while others are defaults of the model;

step 2, inputting a batch (corresponding to mini-batch below) of training samples to the initialized Faster R-CNN model to obtain a predicted classification probability $p_i$ and a predicted bounding box coordinate vector $t_i$ of the $i^{th}$ target box in the training samples under the current model parameters, the target boxes including a background, a line-including table and a line-excluding table;

step 3, performing loss calculation on the output result in step 2 by adopting the following formula, and solving the average loss $\overline{L}$ of all the target boxes in the training samples, $$L(\{p_i\}, \{t_i\}) = \frac{1}{N_{cls}}\sum_i L_{cls}(p_i, p_i^*) + \lambda \frac{1}{N_{reg}}\sum_i p_i^* L_{reg}(t_i, t_i^*),$$

in which $L(\{p_i\}, \{t_i\})$ is the loss of the $i^{th}$ target box, $N_{cls}$ is the value of mini-batch, generally 256 $N_{reg}$ is the number of anchor positions, generally approximately 2400, $\lambda$ is the weight, usually set to 1, then the cls and reg items are almost equal weights, $$\sum_i L_{cls}(p_i, p_i^*)$$

is the logarithmic loss of a target (i.e., a target box) and a non-target, $L_{cls}(p_i, p_i^*) = -\log[p_i^* p_i + (1-p_i^*)(1-p_i)]$, the actual label probability Pi* is 1 if Pi is positive, Pi* is 0 if Pi is negative, $$\sum_i p_i^* L_{reg}(t_i, t_i^*)$$

is a regression loss function, $L_{reg}(t_i, t_i^*) = R(t_i - t_i)$, wherein R is a defined robust loss function (smooth L1), $$\text{smooth}_{L_1}(x) = \begin{cases} 0.5x^2 & \text{if } |x| < 1 \\ |x| - 0.5 & \text{otherwise} \end{cases},$$

ti is a vector indicating 4 parameterized coordinates of the predicted bounding box, and ti* is the coordinate vector of the actual bounding box;

step 4, solving the minimum L by adopting a BP algorithm, and updating all the learning parameters in the Faster R-CNN model; and step 5, repeatedly executing steps 2 to 4 until reaching a set number of iterations. The number of iterations may be set empirically, for example, 100,000 times, but the set number of iterations at least needs to guarantee that the minimum L in step 4 no longer changes.

It should be noted that, in addition to the above target detection method of the Faster R-CNN model, target detection methods of other models, e.g., an R-CNN model, a FastR-CNN model and the like, may also be adopted for element detection.

Figure 6:
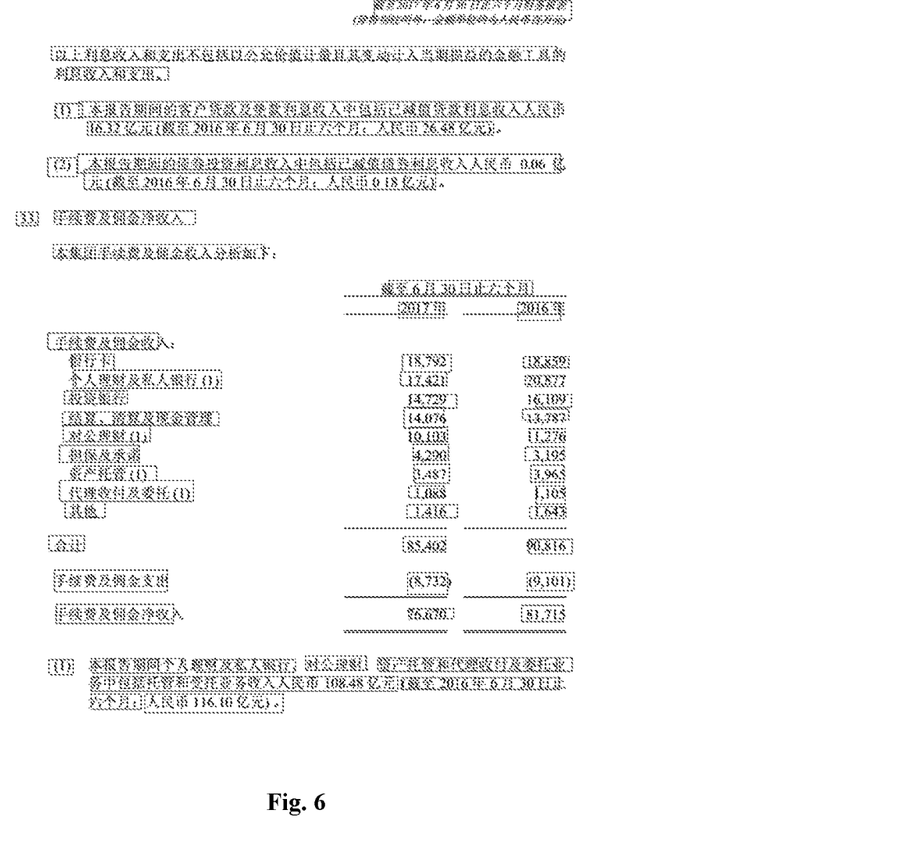
FIG. 6 is a state diagram of FIG. 4 output by a text detection model according to some embodiments of the present application.
Figure 7:
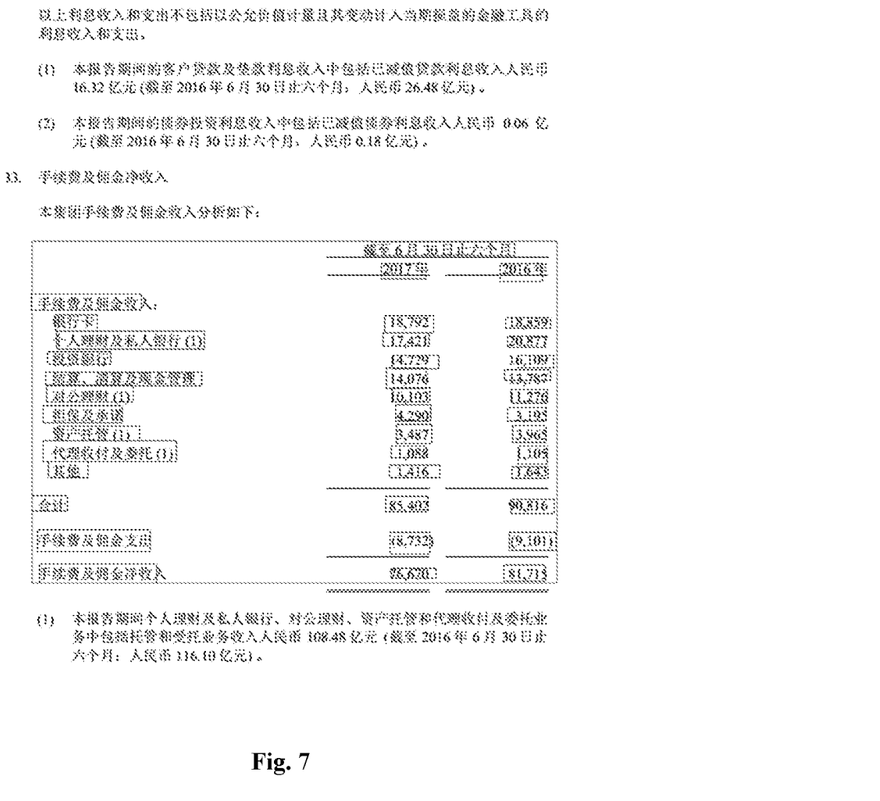
FIG. 7 is a state diagram after the table area of FIG. 5 is corrected according to some embodiments of the present application.

B. detect internal text blocks included in the table area by using a pre-trained text detection model. This step may be implemented in multiple ways, for example, all text blocks in the document image to be parsed may be detected using a pre-trained text detection model, as shown in FIG. 6, and then internal text blocks included in the detected table area are screened using the text blocks intersected with the outer frame of the table area, as shown in FIG. 7. As another implementation, the text detection may also be performed on the document image in which the table area is detected, that is, part of the document image only including the table area is captured, and the text detection is only performed on the part of the document image to obtain the text blocks included in the table area.

A detection model suitable for table texts is obtained by marking target boxes on independent text blocks of an image sample of, for example, 100,000 PDF pages, and performing fine_tuning migration learning training on the marked document text block sample based on a pre-trained EAST text detection model. For the training process of the EAST text detection model, reference may be made to the published article EAST: An Efficient and Accurate Scene Text Detector, authored by Xinyu Zhou, Cong Yao, He Wen, Yuzhi Wang, Shuchang Zhou, Weiran He, and Jiajun Liang in Megvii Technology Inc., Beijing, China, Submitted on 11 Apr. 2017 (v1), last revised 10 Jul. 2017 (this version, v2).

C. determine a space structure of the table. In this step, the space structure of the table may be determined by means of clustering, that is, line clustering and column clustering are performed on all the internal text blocks in the table area to determine the space structure of the table.

D. perform text recognition on the text block in each cell according to the determined space structure of the table, so as to obtain editable structured data by parsing. In this step, the text information of the text blocks in the table area may be recognized by adopting an OCR recognition model, for example.

In the above method, the table area is detected first, then the text blocks are detected, finally, the text blocks in the table area are extracted, and the text information in the text blocks is recognized to obtain the data content included in the table of the document image, thus completing table parsing of the document image. The parsed information can be directly used for later data analysis or used for reconstructing a table.

Figure 3:
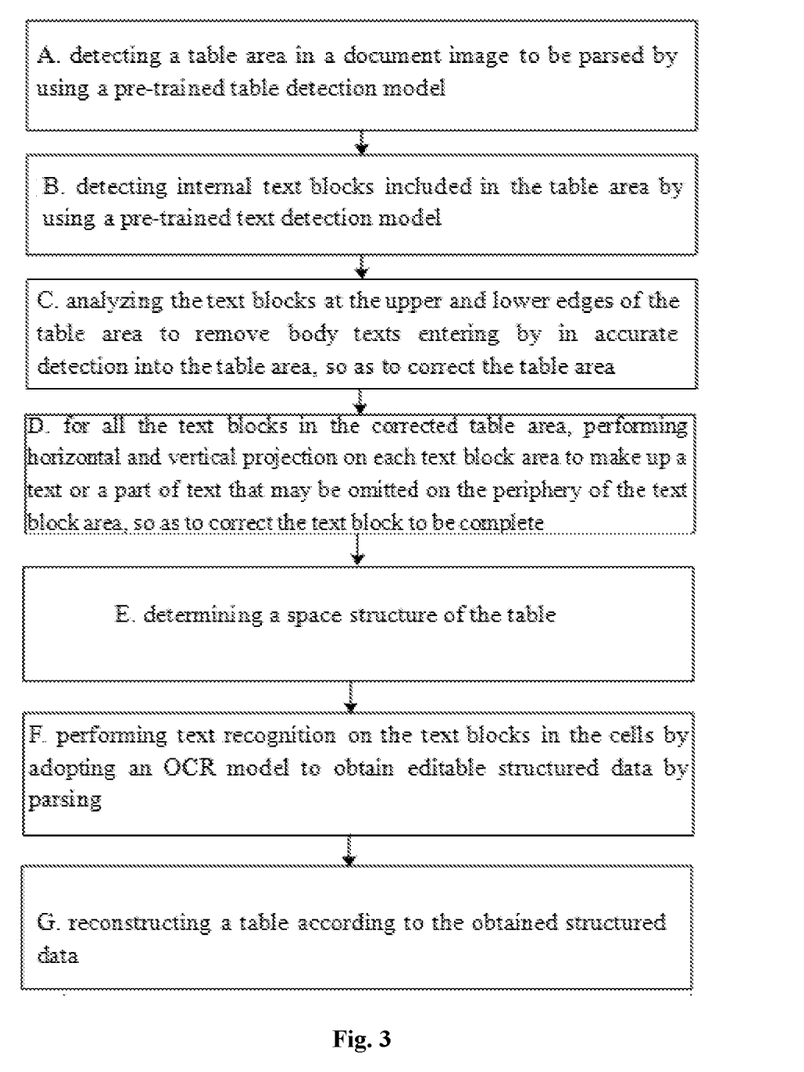
FIG. 3 is a flow diagram of another method for parsing a table in a document image according to some embodiments of the present application.

Referring to FIG. 3, another embodiment of the present application provides a more preferable method for parsing a table in a document image. The method includes the following steps:

A. detect a table area in a document image to be parsed by using a pre-trained table detection model.

B. detect internal text blocks included in the table area by using a pre-trained text detection model.

C. for each recognized table area, analyze the text blocks at the upper and lower edges of the table area to remove body texts entering by inaccurate detection into the table area so as to correct the table area.

As shown in FIG. 5, the table area detected via the table detection model may not be quite accurate. By correcting the detected table area in this step, a more accurate table area can be obtained to improve the accuracy of table parsing.

This step, in specific implementation, can be implemented via the following steps:

C1. for each table area, obtain text blocks in the table area and space coordinates of the text blocks intersected with the table area (the space coordinates of the text blocks are obtained in step B above), and perform line clustering according to the space coordinates to obtain text lines in the table area.

During implementation, more specifically, the coordinate area of each text block is projected in the horizontal direction, and the horizontal area overlap rate is calculated using the text block and the existing text line interval. If the overlap rate is greater than a set overlap threshold, the text block is assigned to this line, otherwise, the text block is assigned to a new line, and the horizontal area of the text block is used as a line interval of the new line.

As shown in FIG. 6, the line interval statistics list at the very start is blank, and the text blocks at the interval are processed sequentially. For the text block "sixth months up to June 30", whether a line interval of which the horizontal overlap rate is more than 0.5 (the set overlap threshold) exists is searched from the line interval statistics list. Because of inexistence, a new line interval is added to the list. Then, a next text block is continuously analyzed, and the text block "2017" will also be put into a new line. The interval overlap rate that the text block "2016" will be matched to the line of the text block "2017" (the overlap rate of the y-axis coordinate interval ranges of the text block "2016" and the text block "2017") is 0.95, more than the overlap threshold 0.5, so the two text blocks "2016" and "2017" are clustered in one line. It can be obtained by repeatedly processing all text blocks in the table area that the three text blocks "bank card", "18,792" and "18,859" are clustered in one line, the three text blocks "personal finance and private banking (1)", "17,421" and "20,877" are clustered in one line, etc.

C2. for the text lines obtained by clustering in the table area, analyze the text blocks at the upper and lower edges of the table area to remove body texts entering by inaccurate detection into the table area.

During implementation, as an example, for the text lines at the upper part (upper edge) of the table area: the number of text blocks of the current text line, the line width of the text line (text line width) and the table width of the table area (table width) are calculated from the first text line of the table area; if the number of text blocks of the current text line is 1 and the ratio of the line width of the text line to the table width is greater than or equal to a set width threshold (e.g., 0.9), the text block is considered to be a body text detected erroneously, and is removed; then next text line is continuously analyzed, until the number of text blocks is more than or equal to 2, or the ratio of the line width to the table width is smaller than the set width threshold.

The line width of the text line is determined by the space coordinates of the text blocks of the text line. If the text line includes one text block, the line width of the text line is the width of the text block. If the text line includes two or more text blocks, the line width of the text line is the sum of the widths of all the text blocks and the spacing widths of the text blocks. For example, the line width of the text line including two text blocks "2017" and "2016" is the width from the left side of the text block "2017" to the right side of the text block "2016".

The processing method for the text lines at the lower part of the table area is same as the above method, and the difference lies in the processing begins from the last line of the table area, until a line has two or more than two text blocks, or the ratio of the line width to the table width is smaller than the width threshold.

For example, as shown in FIG. 6, the first text line of the table area detected in FIG. 5 only includes the text line "sixth months up to June 30", but the ratio of the line width of the text line to the table width is smaller than 0.9, so it is not a body text and should be reserved.

C3. calculate a smallest external rectangular box according to the coordinates of the text blocks of all the screened text lines to obtain an accurate table area. As shown in FIG. 7, the width of the smallest external rectangle is the width between the left side of the text block "fee and commission income" (or "total") and the right side of the text block "(9,101)", and the height of the smallest external rectangle is the height between the upper side of the text block "six months up to June 30" and the lower side of the text block "fee and net commission income".

D. for all the text blocks in the corrected table area, perform horizontal and vertical projection on each text block area to make up a text or a part of text (a part of the text) that may be omitted on the periphery of the text block area, so as to correct the text block to be complete.

Figure 8:
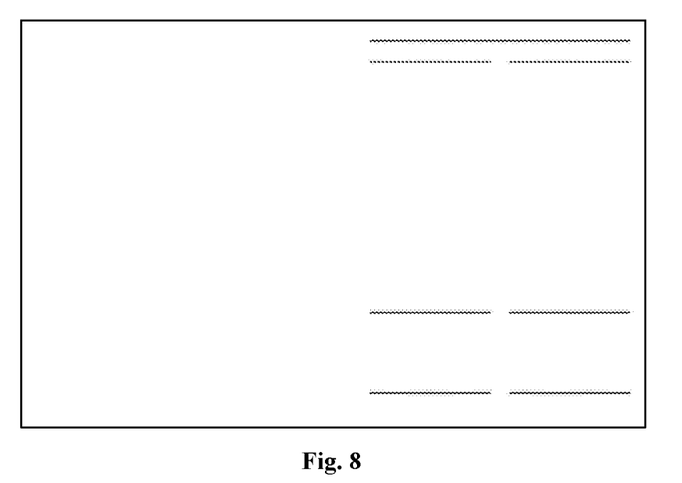
FIG. 8 is a state diagram after a linear mask area is extracted according to some embodiments of the present application.
Figure 9:
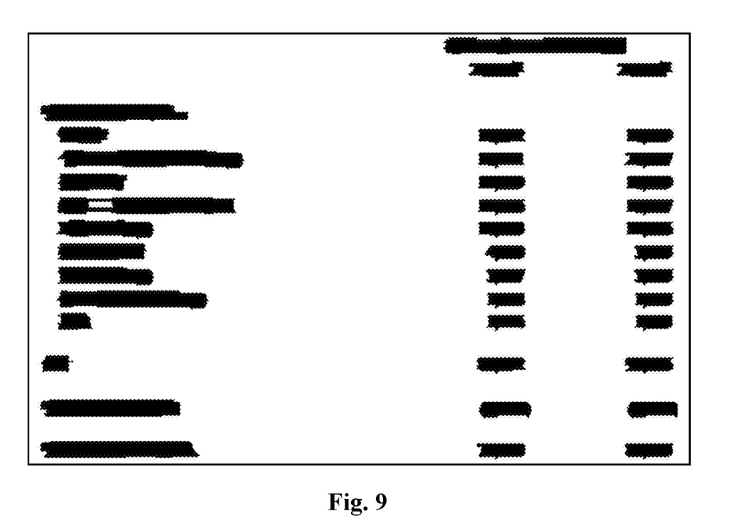
FIG. 9 is a state diagram after a text block area is extracted according to some embodiments of the present application.

In actual implementation, as an example, in this step, an accurate table area and its internal text blocks are extracted first according to the correction result of step C to obtain the width W and the height H of the table area, and the document image including the detected table area and all its internal text blocks is processed into a binary image via an adaptive binarization function adaptiveThreshold in OPENCV by adopting [W*(1/30), 1] as the magnitude of horizontal morphological structure elements and adopting [1, H*(1/30)] as the magnitude of vertical morphological structure elements. Then, the existing linear mask area is extracted using rectangular horizontal and vertical morphological opening operation, that is, the horizontal and vertical morphological filtered images are added using a morphologyEx function in the OPENCV development library to obtain the result as shown in FIG. 8, and straight lines are extracted according to the pixels of the extracted foreground area by using a Hough transform HoughLinesP function in the OPENCV. The detected text blocks may have some deviation, which may result in incomplete contents of OCR recognition, so linear mask pixels as shown in FIG. 8 are removed from the table area image to avoid the influence of the straight lines on the subsequent text recognition and improve the accuracy of text recognition. Finally, image morphological closing operation is performed using the nuclear size of [20,3] to connect the adjacent texts of the same text block to the same block area, as shown in FIG. 9, and each text block is projected horizontally and vertically. For example, for the text block "six months up to June 30", each text block forms an independent connected area after morphological operation, at this time, the center point of x-axis horizontal and y-axis vertical projection of the text block "six months up to June 30" is subject to eight-quadrant area growth according to the area of text detection to obtain complete connected area pixels inside and outside the detected area, the smallest external rectangle is calculated according to the coordinates of the connected area to obtain a complete text bounding box including "six months up to June 30", and other text blocks are processed similarly to obtain relatively complete and accurate text blocks as shown in FIG. 10.

Figure 10:
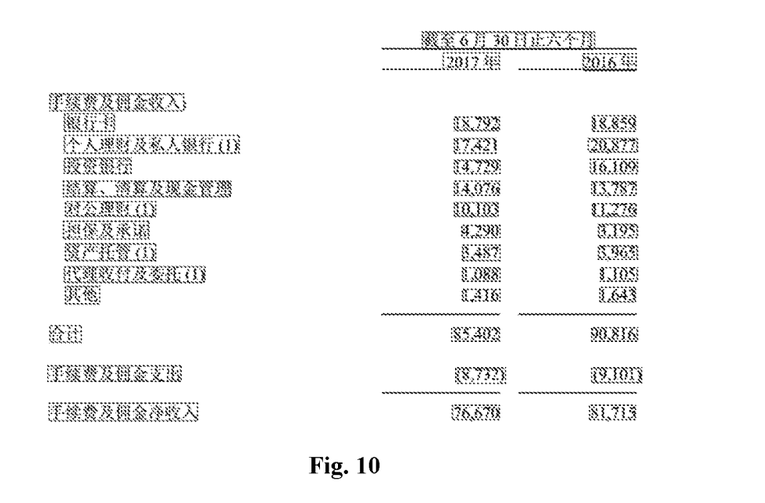
FIG. 10 is a state diagram after the text blocks of FIG. 5 are corrected according to some embodiments of the present application.

A space structure of 15 lines and 3 columns can be obtained by clustering via the space distribution of coordinates of the text blocks corrected in the table as shown in FIG. 10, cell merging information is extracted, e.g., for "six months up to June 30", a straight line exists immediately below the text as analyzed, only one text block "six months up to June 30" exists above the straight line as analyzed reversely, thus, the straight line can be recognized as the area description of the current text block, the column distribution of "six months up to June 30" can be replaced with the column space covered by the straight line at the moment, and "six months up to June 30" can be determined as a merged cell of the second column and the third column. If the condition of one straight line below the text block and only one current text block above the straight line cannot be satisfied, the coverage area of the straight line cannot be adopted as column merging information of text block cells.

E. determine a space structure of the table via line clustering and column clustering. For the implementation of line clustering and column clustering, reference may be made to the prior art or the brief description of the aforementioned line clustering process. The principle of column clustering is same as that of line clustering, and the difference lies in that the coordinate area of each text block is projected in the vertical direction, and the vertical area overlap rate is calculated using the text block and the existing text column interval. If the overlap rate is greater than a set overlap threshold, the text block is assigned to this column, otherwise, the text block is assigned to a new column, and the vertical area of the text block is used as a column interval of the new column.

Figure 11:
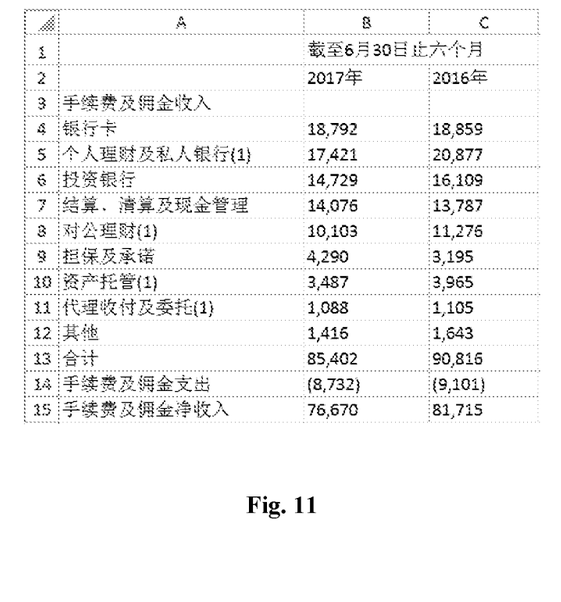
FIG. 11 is an effect diagram of outputting the information in the table area obtained by parsing FIG. 4 to an excel according to some embodiments of the present application.

F. perform text recognition on all the complete and accurate text blocks in the accurate table area by adopting an OCR model so as to parse an editable excel structured data table, as shown in FIG. 11.

G. reconstruct a table according to the parsed structured data. Through the method of the present application, the table in the document image can be automatically and accurately analyzed and extracted, and the structure and data thereof can be automatically parsed and recognized to replace manual input and conversion, so that the related data collection and conversion operations are more efficient. Moreover, the method is applicable to line-including tables or line-excluding tables, color tables or white-and-black tables, and the accuracy of the parsed structure is high.

Based on the same inventive concept as the above method, an embodiment of the present application further provides a device for parsing a table in a document image.

Figure 12:
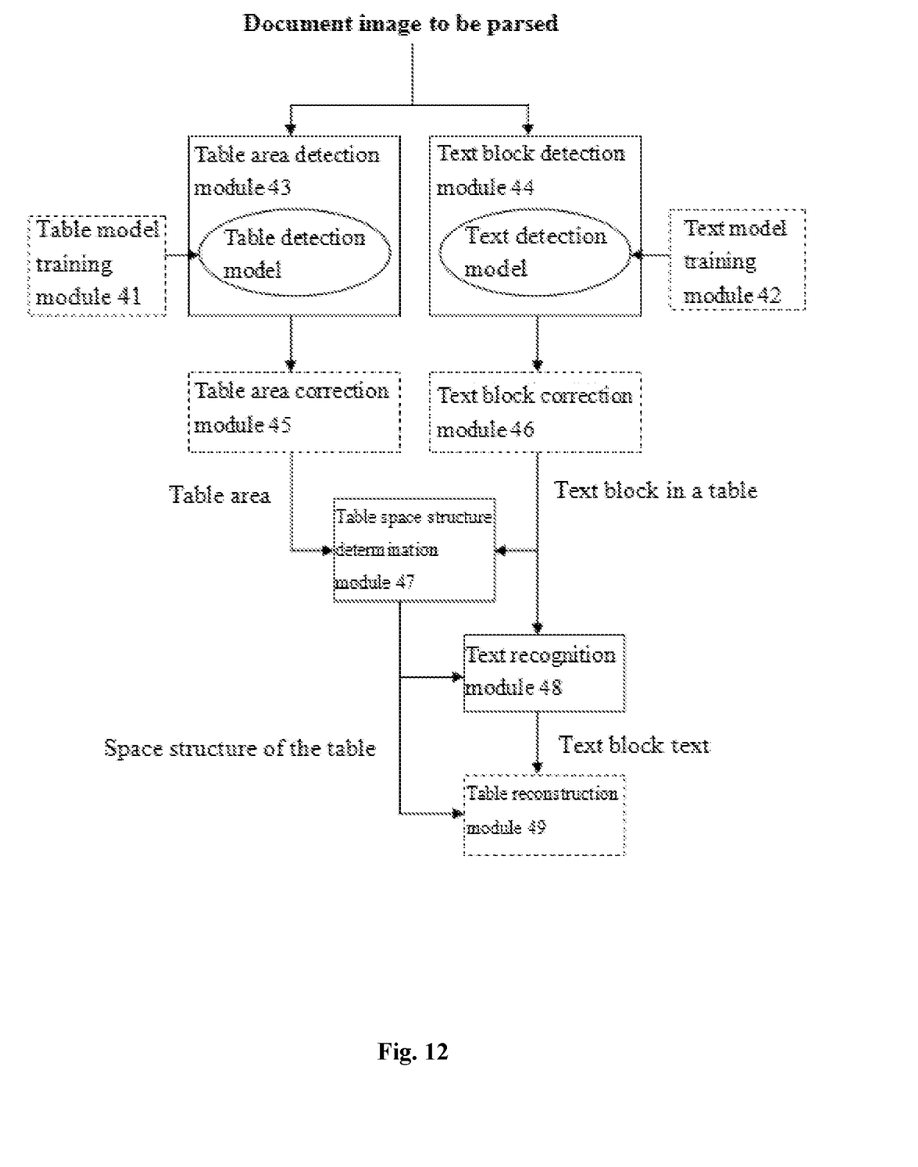
FIG. 12 is a functional module diagram of the device for parsing a table in a document image according to some embodiments of the present application.

As shown in FIG. 12, the device includes a table model training module 41, a text model training module 42, a table area detection module 43, a text block detection module 44, a table area correction module 45, a text block correction module 46, a table space structure determination module 47, a text recognition module 48 and a table reconstruction module 49.

The table model training module 41 is configured to generate a table detection model by training.

The text model training module 42 is configured to generate a text detection model by training.

The table area detection module 43 is configured to detect a table area in a document image to be parsed by using the pre-trained table detection model;

The text block detection module 44 is configured to detect text blocks in the document image to be parsed by using the pre-trained text detection model;

The table area correction module 45 is configured to, for each table area recognized by the table area detection module 43, analyze the text blocks at the upper and lower edges of the table area to remove body texts entering by inaccurate detection into the table area so as to correct the table area.

The text block correction module 46 is configured to, for all the text blocks in the corrected table area, perform horizontal and vertical projection on each text block area to make up a text or a part of text that may be omitted on the periphery of the text block area, so as to correct the text block to be complete.

The table space structure determination module 47 is configured to determine a space structure of the table by means of, for example, line clustering and column clustering.

The text recognition module 48 is configured to perform text recognition on all the text blocks in the detected form area to obtain editable structured data.

The table reconstruction module 49 is configured to reconstruct a table according to the obtained structured data.

In addition, as described above, after the space structure of the table is determined and the text contents of the text blocks are recognized, merged cells (merged cells of multiple lines or multiple columns) may also need to be recognized and detected for different table structures. Therefore, the table parsing device shown in FIG. 12 may further include a merged cell detection module (not shown in the figure), which is configured to extract cell merging information to determine the text blocks which have been subject to cell merging in the table area.

The implementation of completing the foregoing functions by the respective modules may be the one in the above-mentioned method embodiment. For example, the text block detection module 44 may detect all text blocks in the document image to be parsed by using the pre-trained text detection model, and then screen internal text blocks included in the detected table area by using the text blocks intersected with the outer frame of the table area.

In the above device, the table model training module 41 and the text model training module 42 are not necessary, and the corresponding training modules are needed only in the absence of existing available table detection models and text detection models.

In the above device, it could be easily understood that correction is not needed when the table area detected by the table detection model has been accurate and is also not needed when the text blocks detected by the text detection model have been accurate, so the table area correction module 45 and the text block correction module 46 are not necessary either, but only as optional solutions.

In the above device, it could be easily understood that the table reconstruction module 49 is also used as an optional solution and is needed only when the table needs to be reconstructed.

Figure 13:
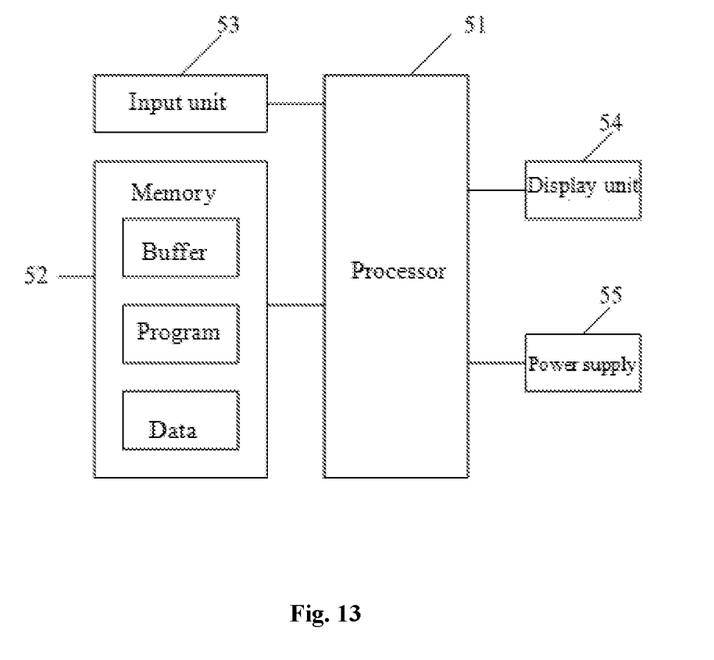
FIG. 13 is a structure block diagram of electronic equipment according to some embodiments of the present application.

As shown in FIG. 13, this embodiment simultaneously provides electronic equipment. The electronic equipment may include a processor 51 and a memory 52, wherein the memory 52 is coupled to the processor 51. It should be noted that the figure is exemplary, and the structure may also be supplemented or replaced with other structure to realize data extraction, chart redrawing, communication or other functions.

As shown in FIG. 13, the electronic equipment may further include an input unit 53, a display unit 54 and a power supply 55. It should be noted that the electronic equipment does not necessarily include all components shown in FIG. 13. Moreover, the electronic equipment may further include components not shown in FIG. 13, referring to the prior art.

The processor 51 is also referred to as a controller or an operation control sometimes, and may include a microprocessor or other processor device and/or logic device. The processor 51 receives an input and controls the operation of each component of the electronic equipment.

The memory 52, for example, may be one or more of a cache, a flash memory, a hard driver, a mobile medium, a volatile memory, a non-volatile memory and other proper device, and may store configuration information of the processor 51, instructions executed by the processor 51, recorded table data and other information. The processor 51 may execute a program stored in the memory 52 to implement information storage or processing or the like. In one embodiment, the memory 52 further includes a buffer memory, i.e., a buffer, to store intermediate information.

The input unit 53, for example, is configured to provide a sample image or a document image to be processed for the processor 51. The display unit 54 is configured to display various state diagrams shown in FIGS. 5-11, or information extracted from the table in the document image, or the reconstructed table. The display unit, for example, may be a liquid crystal display (LCD), but the present application is not limited thereto. The power supply 55 is configured to supply power to the electronic equipment.

An embodiment of the present application further provides a computer readable instruction, wherein when the instruction is executed in the electronic equipment, the program enables the electronic equipment to execute the operation steps included in the method of the present application.

An embodiment of the present application further provides a storage medium storing a computer readable instruction, wherein the computer readable instruction enables the electronic equipment to execute the operation steps included in the method of the present application.

It should be understood that, in various embodiments of the present application, the serial numbers of the above-mentioned steps do not mean the execution sequence. The execution sequence of the steps should be determined based on the functions and inherent logics thereof, but should not constitute any limitation to the implementation process of the embodiment of the present application.

Those of ordinary skill in the art may realize that the units and alogrithm steps of each example described in combination with the embodiments disclosed in the present disclosure can be implemented by electronic hardware, computer software or the combination of computer software and the electronic hardware. In order to clearly describe the interchangeability of hardware and software, the composition and steps of each example are described generally above according to the functions. Whether these functions are executed by hardware or software depends on a specific application and design constraint conditions of the technical solution. Professionals can use different methods to implement the described functions for each specific application, but such implementation should not be considered as going beyond the scope of the present application.

Those skilled in the art may clearly understand that, for the purpose of convenience and briefness in description, for the specific working processes of the above-described systems, devices and units, reference could be made to the corresponding processes in the embodiments of the aforementioned methods, and description is not repeated here.

In the several embodiments provided in the present application, it should be understood that the disclosed systems, devices and methods may be realized in other modes. For example, the embodiments of the above-described devices are only exemplary, for example, the division of the units is only a logic function division, other division modes may be adopted in practice, e.g., a plurality of units or components may be combined or integrated in another system, or some characteristics may be omitted or not executed. In addition, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on a plurality of network units. The objectives of the solutions of the embodiments of the present application may be fulfilled by selecting part of or all of the units according to actual needs.

When the integrated unit is realized in the form of a software functional unit and sold or used as an independent product, the integrated unit may be stored in a computer readable storage medium. Based on such an understanding, the technical solution of the present application substantially, or all or part of the present application making contribution to the prior art, or a part of the technical solution may be embodied in the form of a software product, and the computer software product is stored in a storage medium, which includes a plurality of instructions enabling computer equipment (which may be a personal computer, a server, or network equipment or the like) to execute all of or part of the steps in the methods of the embodiments of the present application. The aforementioned storage medium includes: various media capable of storing program codes, such as a U disk, a mobile hard disk, a read-only memory (ROM), a random access memory (RAM), a magnetic disk or optical disk.

The above description is the specific embodiments of the present application only, but the scope of the present application is not limited thereto, any skilled who is familiar with this art could readily think of variations or substitutions within the disclosed technical scope of the present application, and these variations or substitutions shall fall within the scope of the present application. Thus, the scope of the present application shall be subject to the scope of the claims.

What is claimed:

1. A method for parsing a table in a document image performed by an electronic device having a processor, a display, and memory for storing instruction to be executed by the processor, the method comprising:
    inputting, by the electronic device, a document image to be parsed, the document image including one or more table areas;
    detecting, by the electronic device, a table area in the document image by using a pre-trained table detection model;
    detecting, by the electronic device, internal text blocks included in the table area by using a pre-trained text detection model;
    determining, by the electronic device, a space structure of the table by performing line clustering and column clustering on all the internal text blocks in the table area to determine the space structure of the table; and
    performing, by the electronic device, text recognition on a text block in each cell according to the determined space structure of the table, so as to obtain editable structured data by parsing,
    wherein the step of performing line clustering on all the internal text blocks in the table area comprises:
    performing horizontal projection on each text block, calculating an overlap rate of the horizontal projection area of the text block and an existing text line interval, assigning the text block to this line if the overlap rate is greater than a set overlap threshold, otherwise, assigning the text block to a new line, and taking the horizontal projection area of the text block as a line interval of the new line.

2. The method according to claim 1, wherein the step of detecting internal text blocks included in the table area by using a pre-trained text detection model comprises:
    detecting, by the electronic device, all text blocks in the document image to be parsed by using the pre-trained text detection model; and
    for the detected table area, screening out internal text blocks included in the table area by using the text blocks intersected with an outer frame of the table area.

3. The method according to claim 1, further comprising:
    a table area correction step of analyzing the text blocks at the upper and lower edges of the table area to remove body texts entering by inaccurate detection into the table area so as to correct the table area.

4. The method according to claim 1, further comprising a text block correction step of performing horizontal and vertical projection on each text block area to make up a text or a part of text that may be omitted on the periphery of the text block area so as to correct the text block to be complete.

5. The method according to claim 4, wherein the step of performing horizontal and vertical projection on each text block area to make up a text or a part of text that may be omitted on the periphery of the text block area so as to correct the text block to be complete comprises:
    processing the document image including the detected table area and all the text blocks in the table area into a binary image;
    performing rectangular horizontal and vertical morphological opening operations on the binary image to extract the existing linear mask area, and removing the linear mask area; and
    performing image morphological closing operation on the binary image in which the mask area is removed, connecting the adjacent texts of the same text block to the same block area, performing eight-quadrant area growth on the center point of horizontal and vertical projection of each text block to obtain complete connected area pixels inside and outside the detected area, and calculating a smallest external rectangle according to the coordinates of the connected area to obtain a complete and accurate text block.

6. The method according to claim 1, further comprising: extracting cell merging information to determine the text blocks which have been subject to cell merging in the table area.

7. The method according to claim 6, wherein the step of extracting cell merging information comprises: extracting table lines from the table area, and extracting the cell merging information with the aid of the extracted table lines.

8. The method according to claim 1, wherein the table detection model is obtained via the following training method:
step 1, randomly initializing learning parameters in a Faster R-CNN model;
step 2, inputting a batch of training samples to the initialized Faster R-CNN model to obtain a predicted classification probability $P_i$ and a predicted bounding box coordinate vector $t_i$ of the ith target box in the training samples under the current model parameters;
step 3, performing loss calculation on the output result in step 2 by adopting the following formula, and solving the average loss $\overline{L}$ of all the target boxes in the training samples, $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

in which $L(\{p_i\},\{t_i\})$ is the loss of the ith target box, $N_{cls}$ is the value of mini-batch, $N_{reg}$ is the number of anchor positions, $\lambda$ is the weight, $$\sum_i L_{cls}(p_i, p_i^*)$$

is the logarithmic loss of a target and a non-target, and $$\sum_i p_i^* L_{reg}(t_i, t_i^*)$$

is a regression loss function;
step 4, solving the minimum $\overline{L}$, and updating all the learning parameters in the Faster R-CNN model; and
step 5, repeatedly executing steps 2 to 4 until reaching a set number of iterations.

9. The method according to claim 1, wherein the text recognition is performed on the text block in each cell by adopting an OCR model.

10. The method according to claim 1, further comprising a step of:
reconstructing a table according to the obtained editable structured data.

11. An electronic device for parsing a table in a document image, comprising:
a processor;
a display;
memory; and
a plurality of computer instructions stored in the memory, wherein the computer instructions, when executed by the processor, cause the electronic device to perform operations including:
inputting, by the electronic device, a document image to be parsed, the document image including one or more table areas;
detecting, by the electronic device, a table area in the document image by using a pre-trained table detection model;
detecting, by the electronic device, internal text blocks included in the table area by using a pre-trained text detection model;
determining, by the electronic device, a space structure of the table by performing line clustering and column clustering on all the internal text blocks in the table area to determine the space structure of the table; and
performing, by the electronic device, text recognition on a text block in each cell according to the determined space structure of the table, so as to obtain editable structured data by parsing,
wherein the step of performing line clustering on all the internal text blocks in the table area comprises:
performing horizontal projection on each text block, calculating an overlap rate of the horizontal projection area of the text block and an existing text line interval, assigning the text block to this line if the overlap rate is greater than a set overlap threshold, otherwise, assigning the text block to a new line, and taking the horizontal projection area of the text block as a line interval of the new line.

12. The electronic device according to claim 11, wherein the step of detecting internal text blocks included in the table area by using a pre-trained text detection model comprises:
detecting, by the electronic device, all text blocks in the document image to be parsed by using the pre-trained text detection model; and
for the detected table area, screening out internal text blocks included in the table area by using the text blocks intersected with an outer frame of the table area.

13. The electronic device according to claim 11, wherein the plurality of computer instructions further comprise:
a table area correction step of analyzing the text blocks at the upper and lower edges of the table area to remove body texts entering by inaccurate detection into the table area so as to correct the table area.

14. The electronic device according to claim 11, wherein the plurality of computer instructions further comprise:
a text block correction step of performing horizontal and vertical projection on each text block area to make up a text or a part of text that may be omitted on the periphery of the text block area so as to correct the text block to be complete.

15. The electronic device according to claim 11, wherein the plurality of computer instructions further comprise:
extracting cell merging information to determine the text blocks which have been subject to cell merging in the table area.

16. A non-transitory computer readable storage medium comprising computer readable instructions that, when executed by a processor of an electronic device, cause the electronic device to perform operations including:
inputting, by the electronic device, a document image to be parsed, the document image including one or more table areas;

detecting, by the electronic device, a table area in the document image by using a pre-trained table detection model;

detecting, by the electronic device, internal text blocks included in the table area by using a pre-trained text detection model;

determining, by the electronic device, a space structure of the table by performing line clustering and column clustering on all the internal text blocks in the table area to determine the space structure of the table; and performing, by the electronic device, text recognition on a text block in each cell according to the determined space structure of the table, so as to obtain editable structured data by parsing, wherein the step of performing line clustering on all the internal text blocks in the table area comprises:

performing horizontal projection on each text block, calculating an overlap rate of the horizontal projection area of the text block and an existing text line interval, assigning the text block to this line if the overlap rate is greater than a set overlap threshold, otherwise, assigning the text block to a new line, and taking the horizontal projection area of the text block as a line interval of the new line.

17. The non-transitory computer readable storage medium according to claim 16, wherein the step of detecting internal text blocks included in the table area by using a pre-trained text detection model comprises:

detecting, by the electronic device, all text blocks in the document image to be parsed by using the pre-trained text detection model; and for the detected table area, screening out internal text blocks included in the table area by using the text blocks intersected with an outer frame of the table area.

* * * * *